(12) United States Patent
Black et al.

(10) Patent No.: US 6,708,244 B2
(45) Date of Patent: *Mar. 16, 2004

(54) OPTIMIZED I$_2$O MESSAGING UNIT

(75) Inventors: B. David Black, Escondido, CA (US);
Steven P. Larky, Del Mar, CA (US);
Leah S. Clark, San Diego, CA (US);
David A. Podsiadlo, San Diego, CA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,465

(22) Filed: Jul. 22, 1999

(65) Prior Publication Data

US 2003/0046475 A1 Mar. 6, 2003

(51) Int. Cl.[7] .................................................. G06F 13/00
(52) U.S. Cl. ..................... 710/305; 710/300; 710/260; 710/107; 710/52; 710/21; 710/27; 710/29; 710/35
(58) Field of Search ............................... 710/100, 300, 710/105, 123–124, 305–315, 360, 20–21, 27, 29, 30, 31, 35–39, 52–57; 711/4, 167

(56) References Cited

U.S. PATENT DOCUMENTS

| | | | | |
|---|---|---|---|---|
| 4,263,649 A | * | 4/1981 | Lapp, Jr. ..................... | 710/107 |
| 4,922,416 A | * | 5/1990 | Krishnan et al. ........... | 709/212 |
| 5,790,813 A | * | 8/1998 | Whittaker ................... | 710/113 |
| 5,860,080 A | * | 1/1999 | James et al. ..................... | 711/4 |
| 5,937,173 A | * | 8/1999 | Olarig et al. ............... | 710/312 |
| 5,978,578 A | * | 11/1999 | Azarya et al. ............... | 395/701 |
| 6,052,749 A | * | 4/2000 | Purcell et al. ................ | 710/71 |
| 6,055,597 A | * | 4/2000 | Houg ......................... | 710/127 |
| 6,088,774 A | * | 7/2000 | Gillingham ................. | 711/167 |
| 6,115,760 A | * | 9/2000 | Lo et al. ....................... | 710/52 |
| 6,141,718 A | * | 10/2000 | Garnett et al. .............. | 710/308 |
| 6,192,439 B1 | * | 2/2001 | Grunewald et al. ......... | 710/260 |
| 6,223,240 B1 | * | 4/2001 | Odenwald et al. .......... | 710/129 |
| 6,230,225 B1 | * | 5/2001 | Olarig et al. ............... | 710/128 |
| 6,247,082 B1 | * | 6/2001 | Lo et al. ..................... | 710/105 |
| 6,260,095 B1 | * | 7/2001 | Goodrum .................... | 710/310 |
| 6,260,159 B1 | * | 7/2001 | Garnett et al. ................ | 714/15 |
| 6,282,589 B1 | * | 8/2001 | Porterfield et al. ........... | 710/52 |
| 6,370,668 B1 | * | 4/2002 | Garrett, Jr. et al. ......... | 714/763 |

OTHER PUBLICATIONS

Intelligent I/O (I$_2$O) Architecture Specification, Version 1.5, Mar. 1997, pp. 4–1 through 4–71.
Intelligent I/O (I$_2$O) Architecture Specification, Version 2.0, Mar. 1999, pp. 4–1 through 4–96.
CO–MEM Lite, AN3042 Integrated Circuit Preliminary Data Sheet, Anchor Chips Incorporated, Version 0.9, Jul. 7, 1998, pp. 1–47.

* cited by examiner

*Primary Examiner*—Christopher B. Shin
(74) *Attorney, Agent, or Firm*—Christopher P. Maiorana, P.C.

(57) ABSTRACT

A circuit comprising a storage circuit and a control circuit. The storage circuit may be configured to store one or more message frames received from a first bus and a second bus in one or more memory locations in response to one or more signals. The control circuit may be configured to store and access the one or more signals, wherein the signals are presented to the storage circuit through the first or the second bus such that management overhead of the first or second bus is reduced.

23 Claims, 3 Drawing Sheets

OPTIMIZED I$_2$O MESSAGING UNIT

FIELD OF THE INVENTION

The present invention relates to interface devices generally and, more particularly, to an interface device in an intelligent input/output system.

BACKGROUND OF THE INVENTION

An intelligent input/output system is defined by the Intelligent I/O (I$_2$O) Architecture Specification, version 1.5, dated March 1997, and the Intelligent I/O (I$_2$O) Architecture Specification, version 2.0, dated March 1999, the relevant portions of each which are hereby incorporated by reference. FIG. 1 shows a circuit 10 implementing such an architecture. The circuit 10 is shown having a messaging unit (including four FIFO control logic blocks 12, 14, 16 and 18), a shared memory 20 to store message frames, an interrupt block 22, a first system interface bus 24, a local bus interface bus 26 and a local processor 28. The structure of the circuit 10 is described in the I$_2$O Architecture Specification on pages 4-2 through 4-7. The circuit 10 illustrates the typical structure of an I$_2$O messaging unit. In current solutions, the logic is distributed among up to three distinct elements connecting two buses of two different clock domains. The three elements are a processing component, a random access memory component, and a bus interface component. The circuit 10 suffers from several problems including (i) increased design complexity, (ii) increased manufacturing complexity, and (iii) decreased overall performance.

SUMMARY OF THE INVENTION

The present invention concerns a circuit comprising a storage circuit and a control circuit. The storage circuit may be configured to store one or more message frames received from a first bus and a second bus in one or more memory locations in response to one or more signals. The control circuit may be configured to store and access the one or more signals, wherein the signals are presented to the storage circuit through the first or the second bus such that management overhead of the first or second bus is reduced.

The objects, features and advantages of the present invention include providing a messaging unit that may be used in an I$_2$O system that may (i) optimize messaging functions, (ii) minimize circuit card complexity, (iii) increase performance of the I$_2$O message passing protocol, (iv) minimize component and manufacturing costs, (v) allow simultaneous access to the messaging unit by two buses, (vi) allow simultaneous access to a message frames storage device and the message queue storage device, (vii) place the message unit storage device in a central arbitrated area having a single clock domain, (viii) allow operation of a first and second bus having an independent clock domain, and/or (ix) implement the messaging unit as a self contained, single chip solution implementing all hardware required for an I$_2$O compliant messaging unit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide, in one example, a messaging unit that may be implemented in an I$_2$O system. The messaging unit may be configured to operate with one or more messaging hardware devices as part of a single, self-contained device that may connect two buses (e.g., a local bus and a system bus). Each of the two busses may operate using a separate (e.g., independent) clock domain. The messaging unit may combine I$_2$O messaging elements (e.g., a processor, a memory, and/or a bus interface) into a single, self-contained device. The present invention may reduce the bandwidth required for processor requests.

Figure 2:
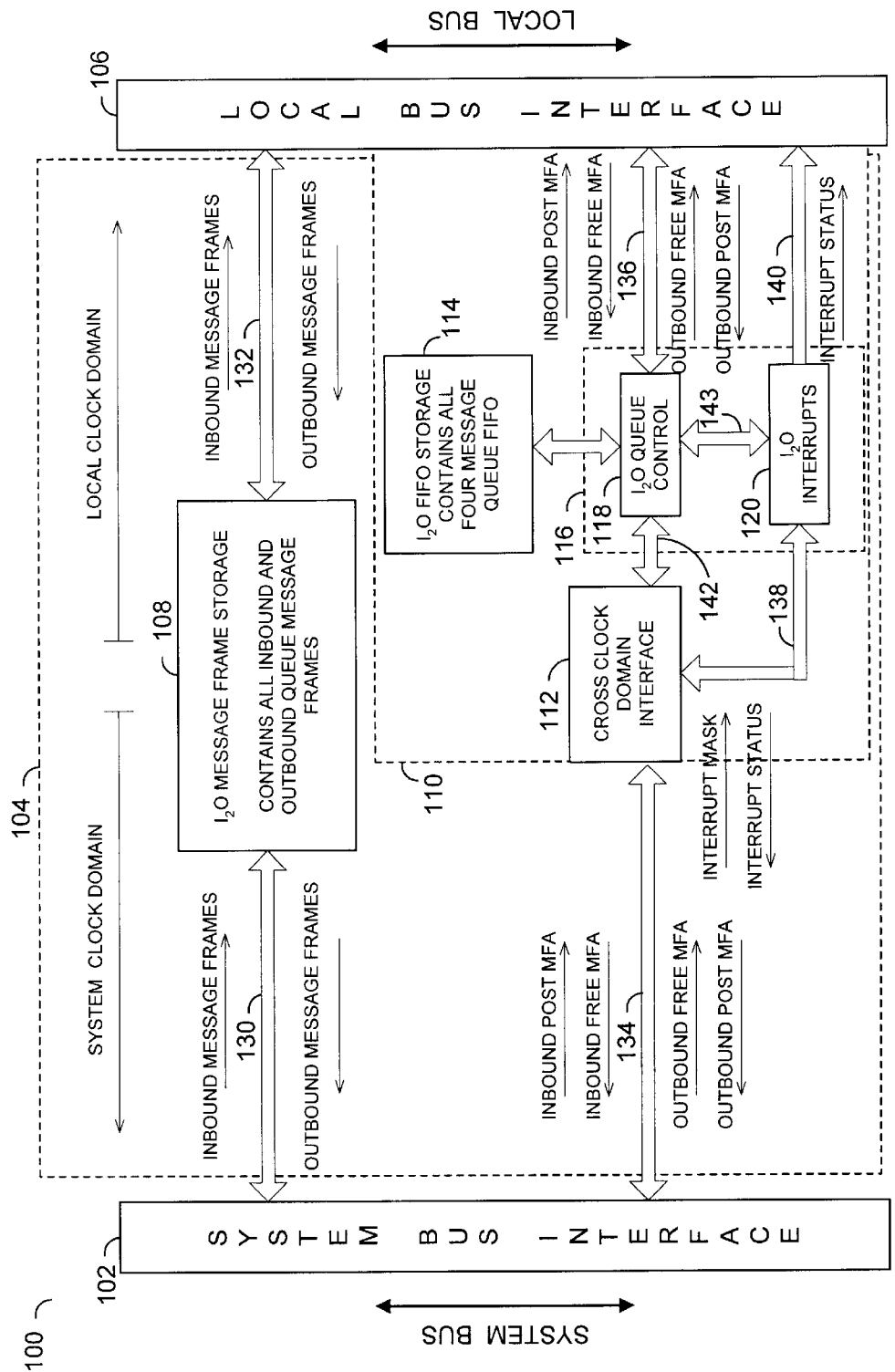
FIG. 2 is a block diagram of a preferred embodiment of the present invention.

Referring to FIG. 2, a block diagram of a circuit 100 is shown in accordance with a preferred embodiment of the present invention. The circuit 100 generally comprises a first bus interface 102, an interface circuit 104 and a second bus interface 106. The interface circuit 104 may be implemented, in one example, as an optimized I$_2$O messaging unit. In one example, the interface circuit 104 may be implemented as a single integrated circuit. The first bus interface 102 may be connected, in one example, to a system bus. The second bus interface 106 may be connected, in one example, to a local bus. The interface circuit 104 generally comprises a frame storage circuit 108 and a control circuit 110. The control circuit 110 generally comprises an interface circuit 112, a storage circuit 114 and a circuit 116. The circuit 116 generally comprises a circuit 118 (e.g., a queue control circuit) and an interrupt circuit 120. The interface circuit 112 may be implemented as a cross clock domain interface circuit. The storage circuit 114 may be implemented, in one example, as a First-In First-Out (FIFO) memory, a Random Access Memory (RAM) with an associated logic, or other appropriate storage device. The storage circuit 114 may store a number of messages. The depth of the storage circuit 114 may be increased accordingly to store a larger number of messages.

The storage circuit 114 may be configured to store a number of message queues. In the example of an I$_2$O compliant device, the storage circuit 114 may hold information concerning four message queues. However, the particular depth (e.g., the number of elements possible) of the queues may be adjusted (e.g., increased or decreased) accordingly to meet the design criteria of a particular implementation.

The frame storage circuit 108 may be configured to store inbound and outbound queue message frames from the bus interface 102 and/or the bus interface 106. The frame storage circuit 108 may be connected to the bus interface 102 through a bus 130. Similarly the frame storage circuit 108 may be connected to the bus interface 106 through a bus 132. The bus 130 and the bus 132 may be implemented, in one example, as bi-directional, multi-bit busses.

The interface circuit 112 may be connected to the bus interface 102 through a bus 134. The queue control circuit 118 may be connected to the bus interface 106 through a bus 136. The interface circuit 112 may be connected to the circuit 120 through a bus 138. The buses 134, 136 and 138 may be implemented, in one example, as bi-directional, multi-bit buses. The circuit 120 may be connected to the bus interface 106 through a bus 140. The bus 140 may be implemented, in one example, as a one-directional, multi-bit bus. The queue control circuit 118 may be connected to the circuit 112 through a multi-bit, bi-directional bus 142.

The storage circuit 108 generally receives inbound message frames through the bus 130 and presents the inbound message frames to the bus interface 106, through the bus 132. Additionally, the storage device 108 may receive outbound message frames over the bus 132 and may present the outbound message frames to the bus interface 102, through the bus 130. The interface circuit 112 may receive inbound post message frame addresses (MFA) and outbound free message frame addresses from the bus interface 102 through the bus 134. Additionally, the interface circuit 112 may present inbound free message frame addresses and outbound post message frame addresses to the bus interface 102 through the bus 134.

Interrupt status signals may be presented to the bus interface 102 over the bus 134. Interrupt mask signals may be received from the bus interface 102 over the bus 134. The interrupt status signals may be received by the interface circuit 112 over the bus 138 from the interrupt circuit 120. The interrupt circuit 120 may also present the interrupt status signals to the bus interface 106 over the bus 140. The queue control circuit 118 may receive inbound free message frame address signals and outbound post message frame address signals from the bus interface 106 over the bus 136. Additionally, the queue control circuit 118 may present inbound post message frame address signals and outbound free message frame address signals over the bus 136 to the bus interface 106.

The circuit 100 illustrates the flow of the $I_2O$ message unit functional data. A description of the particular functional characteristics of the various signals may be found in the $I_2O$ specification. Connection to units external to the optimized $I_2O$ messaging unit 104 may be performed by the interface 102 and the interface 106. The external functions may be generic functions.

The messaging unit 104 may operate in a system having two clock domains (e.g., the clock domain of the system bus and the clock domain of the local bus). There may be two general connections between the different domains provided by (i) the storage circuit 108 and (ii) the interface circuit 112. $I_2O$ message frames may be transferred between the clock domain of the system bus and the clock domain of the local bus through the storage device 108. Access by either the system bus or the local bus is not dependent upon the operational state of the other bus. Accesses are generally governed by the nature of the storage device 108. The storage device 108 may be a memory with two fully-independent read/write access ports. The interface circuit 112 may provide the system bus access to the storage device 114 (through the queue control circuit 118) and to the interrupt device 120.

The circuit 110 generally operates in a single clock domain. However, the system bus connected to the bus interface 102 and the local bus connected to the bus interface 106 may be operating in independent clock domains. Synchronization between the two clock domains generally occurs in the clock domain interface 112. Operation of the circuit 110 generally occurs completely within one clock domain. In one example, the clock domain of the local bus connected to the bus interface 106 may be chosen. However, the clock domain of the system bus connected to the bus interface 102 may be used in certain design implementations.

Figure 1:
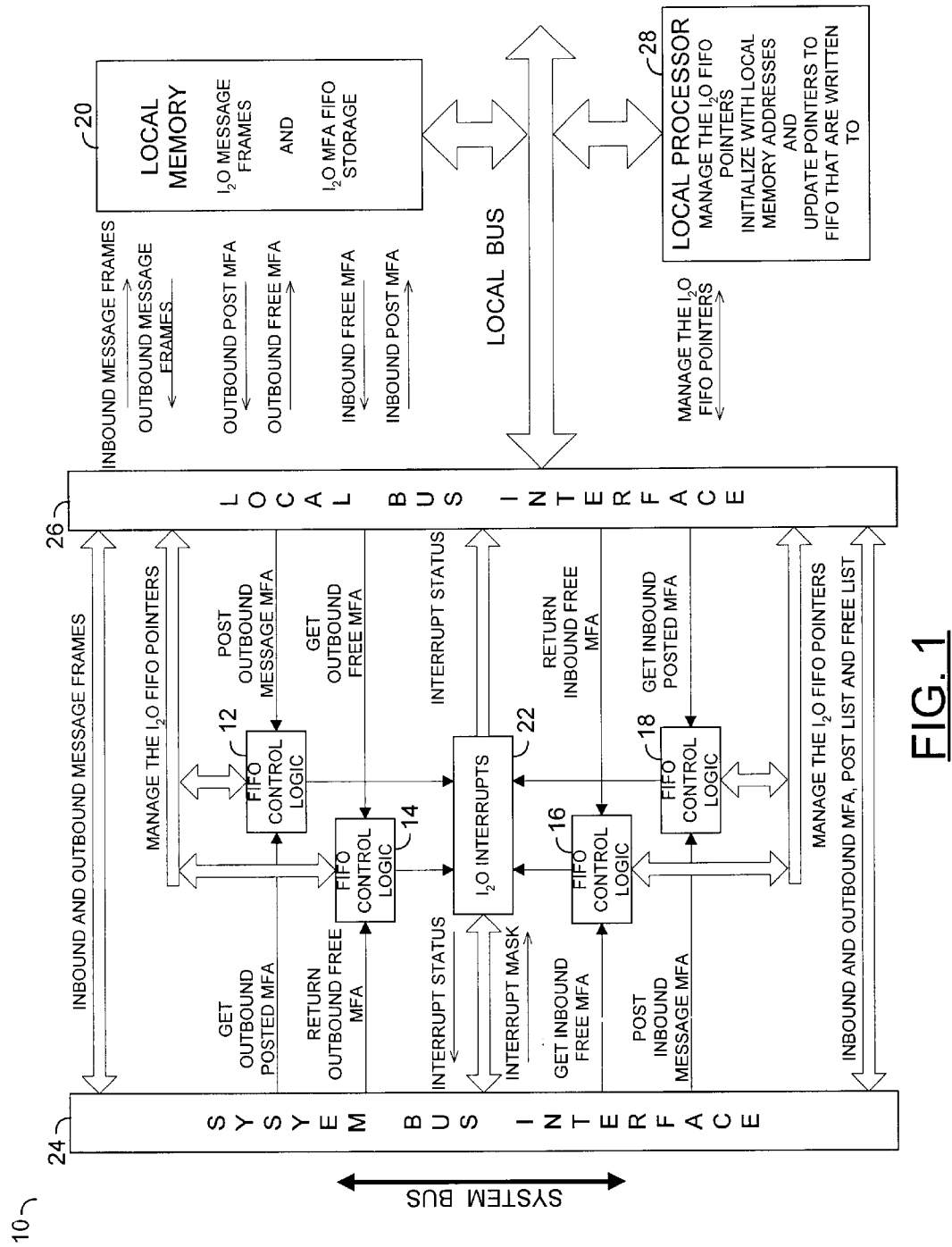
FIG. 1 is a block diagram of a conventional I$_2$O messaging unit.

The memory for all four FIFOs is generally contained in the storage device 114. The queue control circuit 118 (e.g., an $I_2O$ queue control circuit) may be implemented as logic which generally arbitrates all access to the storage circuit 114. The queue control circuit 118 may also manage FIFO pointers and may detect current FIFO status. The queue control circuit 118 may detect the current empty status of the storage device 114. The queue control circuit 118 may forward the status information to the circuit 120 (e.g., an $I_2O$ interrupt circuit). The bus interface 102 and the bus interface 106 may access the interrupt circuit 120 and may be signaled according to the $I_2O$ specification. The queue control circuit 118 may access the interrupt circuit 120 through a bus 143 and may be signaled according to the $I_2O$ specification. In one example, a local processor (not shown) may be connected to the bus interface 102 or the bus interface 106. The local processor may be used to initialize the interface circuit 104. However, the additional functions provided by the local processor 28 of FIG. 1 (i.e., managing and updating pointers, etc.) are not generally required in the interface circuit 104.

Figure 3:
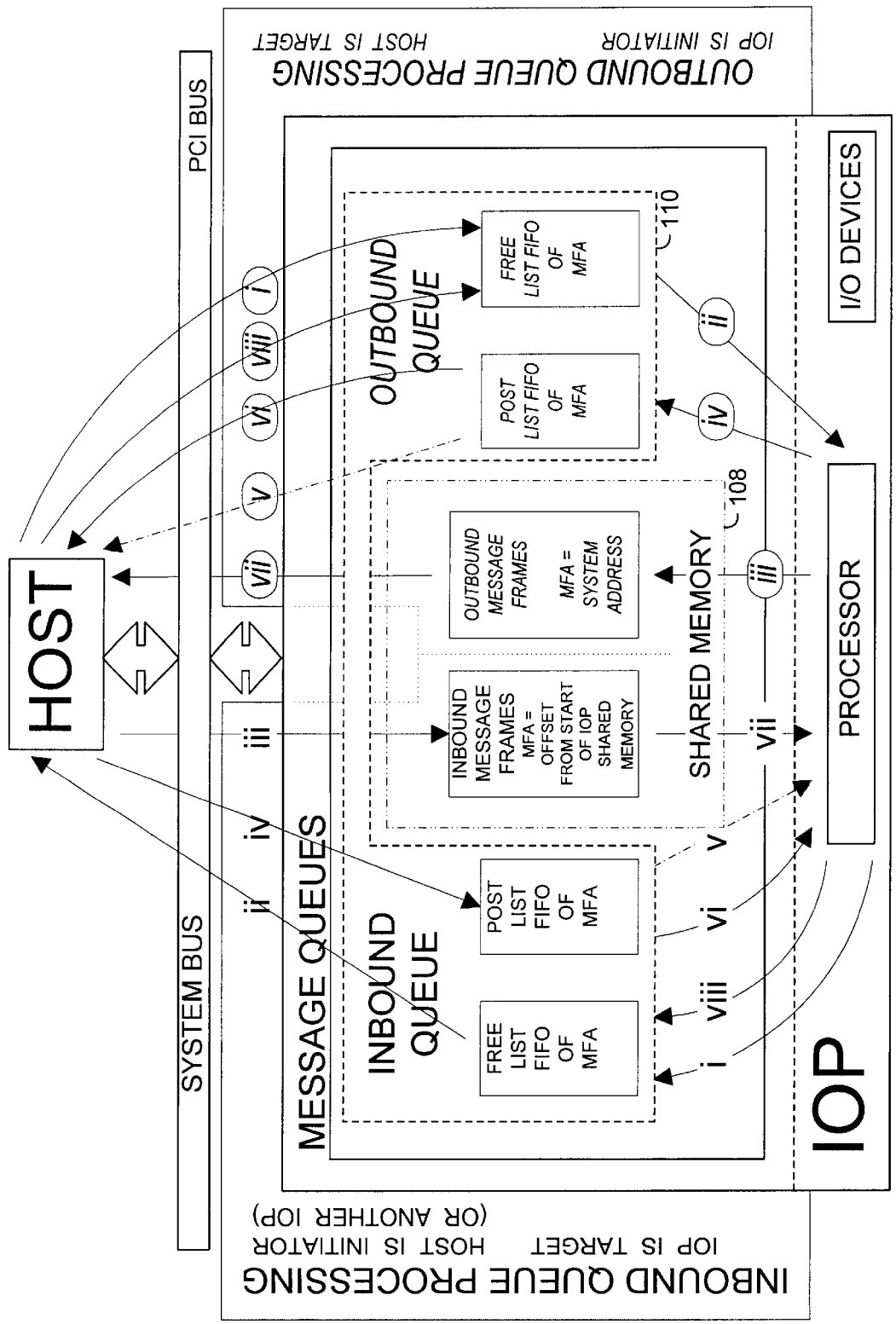
FIG. 3 is a block diagram illustrating the present invention implemented in an existing I$_2$O system.

Referring to FIG. 3, an example of the present invention is shown implemented in an $I_2O$ system. The operation of the circuit 104 may be described by the following method: (i) target initializing free list with message frame addresses (MFA), (ii) initiator receiving free MFA, (iii) initiator transferring message into message frame storage area, (iv) initiator completing transfer and signaling target by posting MFA, (v) notifying target when post list becomes non-empty, (vi) target receiving MFA of posted message, (vii) target transferring message out of message frame storage area, and (viii) target completing transfer by returning MFA to free list.

FIG. 3 illustrates two queues, an inbound queue and an outbound queue. The queues are generally stored in circular buffers in the storage device 114 and may be used for communication of requests, replies, configuration data, etc., between the system host and an $I_2O$ subsystem. For a host message transfer to an input/output processor (IOP), the inbound queue may be used where the host is the initiator and the IOP is the target. For IOP transfers to the host, the IOP may be the initiator and the host may be the target. An IOP may use the outbound queue to transfer messages to the host, but not to transfer messages to other IOP. For IOP to IOP communication, generally only the inbound message queues are used. The host may communicate messages to all IOPs via their respective inbound queues. During a system startup, the host has mapped all IOP spaces within the system area. A simple linear address translation unit within each IOP may be used to map system addresses to a particular portion of the storage device 108 for the particular IOP.

Both directions are shown as manifest by the inbound and outbound queues. However, step (i) is an initialization step and does not generally occur with each message transfer. Also, step (v) (e.g., notification of a posted message), may generate an interrupt or simply rely upon polling by the target. Once a target receives notification of posted messages, the target will generally continue to dispatch messages until the post list FIFO (e.g., the storage device 114) is empty. Thus, the interrupt only needs to occur when the storage device 114 first becomes non-empty, (i.e. there are messages waiting). A read of an empty FIFO (either the free list or post list) will generally return an empty value for the Message Frame Address, (e.g., MFA=FFFF FFFFh).

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
a first storage circuit coupled to (i) a first bus interface and (ii) a second bus interface, wherein said first storage circuit is configured (i) to store a plurality of first message frames received from said first bus interface, (ii) to store a plurality of second message frames received from said second bus interface, (iii) to present said plurality of first message frames to said second bus interface and (iv) to present said plurality of second message frames to said first bus interface in response to one or more first message frame address signals and one or more second message frame address signals; and
a control circuit (i) coupled to said first bus interface and said second bus interface and (ii) configured to store said one or more first and one or more second message frame address signals, wherein said one or more first and one or more second message frame address signals are transferred between said control circuit and (i) said first bus interface and (ii) said second bus interface such that said plurality of first message frames and said plurality of second message frames are transferred independently via said first storage circuit between said first and said second bus interfaces, wherein said first bus interface and said second bus interface simultaneously access said first storage circuit.

2. The circuit according to claim 1, wherein said control circuit comprises a second storage circuit configured to store said one or more first message frame addresses and said one or more second message frame address signals.

3. The circuit according to claim 1, wherein said first storage circuit and said control circuit are implemented in an I$_2$O system.

4. The circuit according to claim 1, wherein said first bus interface is coupled to a system bus.

5. The circuit according to claim 1, wherein said second bus interface is coupled to a local bus.

6. The circuit according to claim 1, wherein said first bus interface and said second bus interface access said first storage circuit at different times.

7. The circuit according to claim 1, wherein said first bus interface and said second bus interface simultaneously access said control circuit.

8. The circuit according to claim 1, wherein said first bus interface and said second bus interface access said control circuit at different times.

9. The circuit according to claim 1, wherein said first storage circuit is configured to operate in two clock domains and said control circuit is configured to operate in a single clock domain.

10. The circuit according to claim 9, wherein said single clock domain is synchronized with a clock domain of either said first bus or said second bus.

11. The circuit according to claim 10, wherein said control circuit further comprises a clock domain interface circuit configured to synchronize said clock domain of said control circuit with said clock domain of said first bus and said clock domain of said second bus.

12. The circuit according to claim 1, wherein said control circuit further comprises a second control circuit configured to control the transfers of said one or more first message frame address signals and said one or more second message frame address signals between a second storage circuit and said first and second bus interfaces.

13. The circuit according to claim 12, wherein said second control circuit further comprises:
a queue control circuit configured to control the access to said one or more first and said one or more second message frame address signals; and
an interrupt circuit configured to present one or more interrupts to said first bus interface, said second bus interface and said second control circuit, said one or more interrupts generated in response to said one or more first message frame address signals and said one or more second message frame address signals.

14. The circuit according to claim 1, wherein said first storage circuit and said control circuit are integrated on a single integrated circuit.

15. The circuit according to claim 1, wherein said circuit is configured to reduce management overhead of said first or second bus.

16. The circuit according to claim 1, wherein said first storage circuit comprises a multi-port random access memory.

17. The circuit according to claim 1, wherein said plurality of first message frames and said plurality of second message frames are transferred between said first and second busses independently of an operational state of said second and first busses, respectively.

18. The apparatus according to claim 1, wherein said one or more first message frame address signals and said one or more second message frame address signals comprise:
one or more first message frame address signals received from said first bus interface for transfer to said second bus interface and indicating a message frame address available for storing one or more of said first message frames;
one or more first message frame address signals received from said second bus interface for transfer to said first bus interface and indicating a message frame address containing one or more of said first message frames;
one or more second message frame address signals received from said first bus interface for transfer to said second bus interface and indicating a message frame address containing one or more of said second message frames; and
one or more second message frame address signals received from said second bus interface for transfer to said first bus interface and indicating a message frame address available for storing one or more of said second message frames.

19. A circuit comprising:
a first storage circuit coupled to (i) a first bus interface and (ii) a second bus interface, wherein said first storage circuit is configured (i) to store a plurality of first message frames received from said first bus interface, (ii) to store a plurality of second message frames received from said second bus interface, (iii) to present said plurality of first message frames to said second bus interface and (iv) to present said plurality of second message frames to said first bus interface in response to one or more first message frame address signals and one or more second message frame address signals; and
a control circuit (i) coupled to said first bus interface and said second bus interface and (ii) configured to store said one or more first and one or more second message frame address signals, wherein said one or more first and one or more second message frame address signals are transferred between said control circuit and (i) said first bus interface and (ii) said second bus interface such that said plurality of first message frames and said plurality of second message frames are transferred independently via said first storage circuit between said first and said second bus interfaces, wherein said first bus interface and said second bus interface simultaneously access said control circuit.

20. A circuit comprising:

means for storing (i) a plurality of first message frames being transferred from a first bus to a second bus and (ii) a plurality of second message frames being transferred from said second bus to said first bus in response to one or more first message frame address signals and one or more second message frame address signals, said means for storing coupled between said first bus and said second bus; and means for storing and controlling access to said one or more first and said one or more second message frame address signals coupled between said first bus and said second bus, wherein said one or more first and said one or more second message frame address signals are presented to said means for storing said plurality of first message frames and said plurality of second message frames through said first bus and said second bus such that said plurality of first message frames and said plurality of second message frames are transferred independently via said means for storing said plurality of first message frames and said plurality of second message frames between said first and said second busses, wherein said first bus and said second bus are simultaneously accessed.

21. The circuit according to claim 20, wherein said storage means and said control means are implemented in an $I_2O$ system.

22. A method for managing an input/output messaging system comprising the steps of:

(A) storing (i) a plurality of first message frames being transferred from a first bus to a second bus and (ii) a plurality of second message frames being transferred from said second bus to said first bus in one or more memory locations independently accessible via said first bus and said second bus in response to one or more first message frame address signals and one or more second message frame address signals; and (B) storing and controlling access to said one or more first message frame address signals and said one or more second message frame address signals, wherein said one or more first message frame address signals and said one or more second message frame address signals access said one or more memory locations through said first bus and said second bus such that said plurality of first message frames and said plurality of second message frames are transferred independently via said one or more memory locations between said first and said second busses, wherein said first bus and said second bus are simultaneously accessed.

23. The method according to claim 22, wherein said method is implemented in an $I_2O$ system.

* * * * *